H. P. RESTON.
EXPANSIVE SCREW.
APPLICATION FILED NOV. 14, 1911.
1,033,120. Patented July 23, 1912.
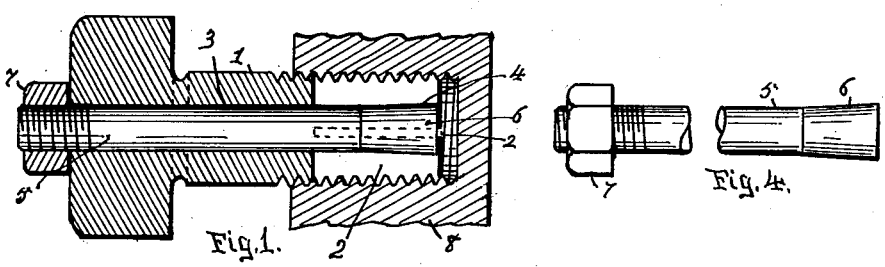
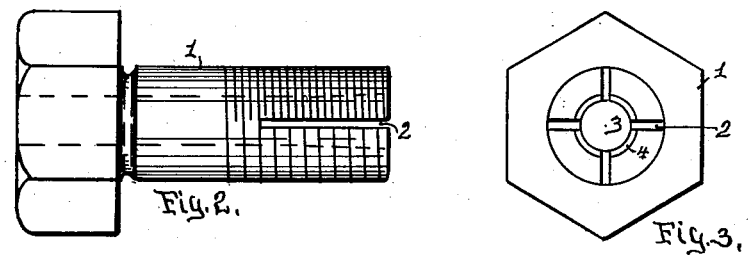
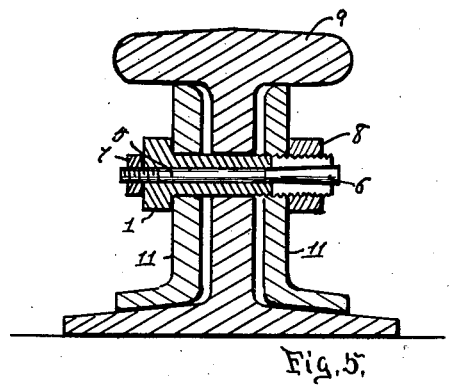
Witnesses.
Samuel S. Carr.
James G. Carr.
Henry P. Reston. Inventor.
By Robert S. Carr. Atty.

UNITED STATES PATENT OFFICE.

HENRY PERCY RESTON, OF OAKLEY, OHIO.

EXPANSIVE SCREW.

1,033,120.   Specification of Letters Patent.   Patented July 23, 1912.

Application filed November 14, 1911. Serial No. 660,191.

*To all whom it may concern:*

Be it known that I, HENRY P. RESTON, a citizen of England, residing at Oakley, Ohio, have invented a new and useful Improvement in Expansive Screws, of which the following is a specification.

My invention relates to expansive screws of the class adapted to the use of machine tools, fish plates or other suitable purposes, and the objects of my improvement are to provide means for removably securing the screw in predetermined positions of adjustment within a coöperating internally threaded member; to provide means for locking a nut securely thereon; to form a screw with radial slots in its threaded end portion and with an axial opening adapted to receive a taper pin for expanding the slotted portion thereof; to provide a hollow and slotted screw with a tapered pin adjustable therein by means of a nut, and to provide simple and durable construction of parts for securing facility of operation with efficiency and accuracy of action. These objects may be attained in the following described manner as illustrated in the accompanying drawings, in which:

Figure 1 is a longitudinal section of a cap screw embodying my improvements; Figs. 2 and 3 respective side and end elevations thereof; Fig. 4 an elevation of the taper spreading pin with adjusting nut, and Fig. 5 a transverse section showing the screw as applied to a track rail and fish plates.

In the drawings, 1 represents a cap screw formed with open radial slots 2 in its threaded portion and with an axial opening 3 therethrough which may terminate at its slotted end in an enlarged slow taper 4. An expanding pin 5 formed with a slow tapered head 6 and provided at its point with an adjusting nut 7 may be removably inserted through the axial opening 3 in the screw, as shown in Fig. 1. The tightening of the nut 7 serves to force the expanding pin with its head 6 within the correspondingly tapered portion 4 of the opening 3 in the screw for expanding its split portion with the thread thereon into immovable engagement with the internally threaded member or nut 8, as shown in Figs. 1 and 5. The adjusting nut may be loosened or removed and the expanding pin driven in a rearward direction for releasing its tapered head from the axial opening when the screw may be easily removed or accurately readjusted within the member 8 as desired.

In operation, the screw may be formed without a head and used as a stud if desired. The threaded opening in member 8 may be closed at the bottom as shown in Fig. 1 or it may be in the form of a nut as shown in Fig. 5. In either form the expanding pin may be tightened or loosened from its point or front end whether its taper head be exposed or concealed.

Applicant's device is peculiarly suited to machine tools where it is frequently necessary to removably secure a screw or stud in a threaded opening.

In track rail 9 and fish plate 11, connections, the nut 8 may be securely locked by the expanding pin from becoming loosened by the vibrating action to which it is exposed.

Having fully described my improvement, what I claim as my invention and desire to secure by Letters Patent of the United States is:—

1. An expansive bolt of the type set forth consisting of a stud adjustable within an opening in a member, and formed with an axial opening therethrough and with a split point, and a bolt inserted through said axial opening and formed with a tapered head and provided with an adjusting nut on its point adapted to contact with the heel end of the stud for moving and maintaining the bolt with its head into detachable engagement with the split portion of the stud for removably securing said stud within the opening in said member.

2. An expansion bolt of the type set forth, consisting of a sleeve of uniform diameter having one end split and formed with exterior threads and also with a wrench engaging head at its opposite end, a bolt formed at one end with a conical head and threaded at the other end, said bolt being arranged in said sleeve with its threaded end projecting beyond the head of the sleeve and a nut on said threaded end of the bolt adapted to bear against the head of the sleeve and to move and maintain the bolt with its conical head partially within the sleeve for expanding the split point thereof.

3. The combination of a member formed with an internally threaded opening, a screw adjustable within said opening, said screw being formed with a split point and with an axial opening therethrough and a tapered pin removably inserted through said opening and provided on its point with an adjusting nut for moving the pin longitudinally to expand the split portion of the screw and for maintaining it in adjusted position therein.

4. The combination with a member formed with an opening closed at the bottom, of a stud formed with an axial opening and with a split point adjustable within the opening in said member, and a pin inserted through said axial opening and formed with a tapered head and with an adjusting screw on its point for moving and maintaining the bolt with its head within the split portion of the stud for securing it in adjusted position within said member.

HENRY PERCY RESTON.

Witnesses:
STANLEY G. V. SOWDLE,
R. S. CARR.